US012779476B2

(12) United States Patent
Bachvarov et al.

(10) Patent No.: US 12,779,476 B2
(45) Date of Patent: Nov. 3, 2026

(54) METHOD OF SEPARATING A LIQUID MIXTURE IN A CENTRIFUGAL SEPARATOR FOR REDUCING FOAM IN A SLUDGE COLLECTING VESSEL

(71) Applicant: Alfa Laval Corporate AB, Lund (SE)

(72) Inventors: Doncho Bachvarov, Søborg (DK); Yacine Djedou, Huddinge (SE)

(73) Assignee: ALFA LAVAL CORPORATE AB, Lund (SE)

( * ) Notice: Subject to any disclaimer, the term of this patent is extended or adjusted under 35 U.S.C. 154(b) by 470 days.

(21) Appl. No.: 18/561,213

(22) PCT Filed: May 13, 2022

(86) PCT No.: PCT/EP2022/063062
§ 371 (c)(1),
(2) Date: Nov. 15, 2023

(87) PCT Pub. No.: WO2022/258313
PCT Pub. Date: Dec. 15, 2022

(65) Prior Publication Data

US 2024/0253064 A1 Aug. 1, 2024

(30) Foreign Application Priority Data

Jun. 7, 2021 (EP) .................................... 21178029

(51) Int. Cl.
*B04B 15/04* (2006.01)
*B04B 1/14* (2006.01)
(Continued)

(52) U.S. Cl.
CPC ................ *B04B 15/04* (2013.01); *B04B 1/14* (2013.01); *B04B 11/04* (2013.01); *B04B 15/08* (2013.01)

(58) Field of Classification Search
CPC .... B04B 9/04; B04B 1/08; B04B 1/12; B04B 7/02; B04B 9/12; B04B 11/02; B04B 15/08; B04B 15/04; B04B 1/14; B04B 11/04
(Continued)

(56) References Cited

U.S. PATENT DOCUMENTS 2,510,498 A * 6/1950 Gaeng ...................... C12H 1/00 99/277.1
2,779,536 A 1/1957 Pomeroy
3,239,137 A * 3/1966 Wenger ..................... B04B 1/14 494/48
3,300,129 A * 1/1967 Brunati ................... B04B 15/08 494/901
(Continued)

FOREIGN PATENT DOCUMENTS

CN 102015544 A 4/2011
CN 102317421 A 1/2012
(Continued)

OTHER PUBLICATIONS

International Search Report, issued in PCT/EP2022/063062, dated Sep. 14, 2022.
(Continued)

*Primary Examiner* — Charles Cooley
(74) *Attorney, Agent, or Firm* — Birch, Stewart, Kolasch & Birch, LLP

(57) ABSTRACT

In a method of separating a liquid mixture in a centrifugal separator, the centrifugal separator includes a centrifuge bowl arranged to rotate around an axis of rotation and in which the separation of a liquid mixture takes place; a frame which delimits a surrounding space that is sealed relative the surroundings of the frame and in which the centrifuge bowl is arranged; a drive member configured to rotate the centrifuge bowl in relation to the frame around the axis of rotation,
(Continued)

wherein the centrifuge bowl further comprises an inlet for receiving the liquid mixture to be separated, at least one liquid outlet for discharging a separated liquid phase and a sludge outlet for discharging a separated sludge phase to the surrounding space and a vessel connected to the surrounding space and arranged for collecting the separated sludge phase discharged from the centrifuge bowl. The method includes supplying a liquid feed mixture to be separated to the inlet of the centrifuge bowl; separating the liquid feed mixture into at least one separated liquid phase and a separated sludge phase; removing gas from the surrounding space to obtain a sub-atmospheric pressure in the surrounding space; discharging a separated sludge phase to the surrounding space; collecting the sludge phase in the vessel; removing the sludge phase from the vessel; and spraying liquid into the vessel after removing the sludge phase from the vessel to reduce the level of foam present in the vessel.

20 Claims, 2 Drawing Sheets

(51) Int. Cl.
*B04B 11/04* (2006.01)
*B04B 15/08* (2006.01)

(58) Field of Classification Search
USPC .......................... 494/56, 57, 70, 83; 210/750
See application file for complete search history.

(56) References Cited

U.S. PATENT DOCUMENTS

| | | | | | |
|---|---|---|---|---|---|
| 10,357,787 | B2 * | 7/2019 | Thorwid | B04B 15/08 |
| 10,427,171 | B2 * | 10/2019 | Thorwid | B04B 15/08 |
| 11,396,026 | B2 * | 7/2022 | Thorwid | B04B 11/02 |
| 2005/0006319 | A1 * | 1/2005 | Scholz | B01D 21/2483 210/742 |
| 2021/0107014 | A1 | 4/2021 | Hilding et al. | |
| 2023/0099252 | A1 * | 3/2023 | Larsson | B04B 1/08 73/861 |
| 2024/0253059 | A1 * | 8/2024 | Bachvarov | B04B 15/08 |

FOREIGN PATENT DOCUMENTS

| | | | | | |
|---|---|---|---|---|---|
| CN | 107185737 | A | * | 9/2017 | B04B 15/04 |
| CN | 108698051 | A | | 10/2018 | |
| CN | 110573260 | A | | 12/2019 | |
| EP | 4635630 | A1 | * | 10/2015 | B04B 11/04 |
| EP | 4624051 | A1 | * | 10/2025 | B04B 1/10 |
| GB | 1 244 577 | A | | 9/1971 | |
| WO | WO 96/00128 | A1 | | 1/1996 | |
| WO | WO 2009/111582 | A2 | | 9/2009 | |
| WO | WO 2010/096002 | A1 | | 8/2010 | |
| WO | WO 2010/101524 | A2 | | 9/2010 | |
| WO | WO 2010/101524 | A3 | | 10/2010 | |
| WO | WO 2017/144339 | A1 | | 8/2017 | |
| WO | WO 2018/202611 | A1 | | 11/2018 | |

OTHER PUBLICATIONS

Written Opinion of the International Searching Authority, issued in PCT/EP2022/063062, dated Sep. 14, 2022.

* cited by examiner

METHOD OF SEPARATING A LIQUID MIXTURE IN A CENTRIFUGAL SEPARATOR FOR REDUCING FOAM IN A SLUDGE COLLECTING VESSEL

FIELD OF THE INVENTION

The present invention relates to the field of centrifugal separators, and more specifically to a method of separating a liquid mixture in a centrifugal separator.

BACKGROUND OF THE INVENTION

Centrifugal separators are generally used for separation of liquids and/or for separation of solids from a liquid. During operation, liquid mixture to be separated is introduced into a rotating bowl and heavy particles or denser liquid, usually water, accumulates at the periphery of the rotating bowl whereas less dense liquid accumulates closer to the central axis of rotation. This allows for collection of the separated fractions, e.g. by means of different outlets arranged at the periphery and close to the rotational axis, respectively.

In order to overcome problems with high energy consumption of the centrifugal separator during operation, it is known e.g. from WO10101524 to create a sub-atmospheric pressure around the rotating centrifuge bowl during operation. The removal of gas due to the creation of the sub-atmospheric pressure reduces friction losses during operation.

However, a large number of centrifugal separators are arranged such that a separated sludge phase is discharged intermittently to the space surrounding the centrifuge bowl. This may create problems, since components in the discharged sludge phase may be affected by the low pressure. For example, when separating liquid mixtures containing dissolved gas, such as carbon dioxide ($CO_2$), the low pressure may promote foaming in the separated sludge phase. This may affect the whole separator negatively, since foaming may cause a variety of operational problems in the separator.

Thus, there is a need in the art for improved methods of running a centrifugal separator in sub-atmospheric pressure when processing liquid mixtures containing dissolved gas.

SUMMARY OF THE INVENTION

It is an object of the invention to at least partly overcome one or more limitations of the prior art. In particular, it is an object to provide a method of separating a liquid mixture containing dissolved gas with a centrifugal separator.

As a first aspect of the invention, there is provided a method of separating a liquid mixture in a centrifugal separator, wherein the centrifugal separator comprises

- a centrifuge bowl arranged to rotate around an axis of rotation (X) and in which the separation of a liquid mixture takes place,
- a frame which delimits a surrounding space that is sealed relative the surroundings of the frame and in which said centrifuge bowl is arranged,
- a drive member configured to rotate the centrifuge bowl in relation to the frame around the axis of rotation (X), wherein the centrifuge bowl further comprises an inlet for receiving the liquid mixture to be separated, at least one liquid outlet for discharging a separated liquid phase and a sludge outlet for discharging a separated sludge phase to the surrounding space,
- a vessel connected to the surrounding space and arranged for collecting the separated sludge phase discharged from the centrifuge bowl, wherein the method comprises the steps of a) supplying a liquid mixture to be separated to the inlet of the centrifuge bowl, b) separating the liquid mixture into at least one separated liquid phase and the separated sludge phase, c) removing gas from the surrounding space to obtain a sub-atmospheric pressure in the surrounding space, d) discharging the separated sludge phase to said surrounding space, e) collecting said separated sludge phase in said vessel, f) removing said separated sludge phase from said vessel, g) spraying liquid into said vessel after step f) to reduce the level of foam present in said vessel.

The steps a)-g) do not necessarily need to be performed in the above sequence, and some steps may be performed at the same time. As an example, step c) of removing gas may be performed during all of the other steps, i.e. also before the supplying of liquid mixture in step a).

The centrifugal separator may be a disc-stack centrifugal separator, e.g. as disclosed in US20210107014. The centrifugal separator is arranged for discharging a sludge phase, i.e. a separated sludge phase that may also contain some liquid, to the space surrounding the centrifuge bowl. This may be performed by a continuous discharge of the separated sludge phase, i.e. the sludge outlet may be arranged for continuous discharge of the separated sludge phase during operation, or by an intermittent discharge of the separated sludge phase, in which the sludge outlet may be in the form of a set of ports arranged to be opened intermittently during operation. The centrifugal separator may be arranged for emptying a partial content of the bowl during such an intermittent discharge (partial discharge) or arranged for emptying the whole content of the centrifuge bowl during intermittent discharge (full discharge).

The first aspect of the invention is based on the insight that foaming occurs especially in the vessel that is used for collecting the discharged sludge phase when operating the separator at sub-atmospheric pressure. Such foaming may have negative impact on the sludge pump used for removing solids from the vessel. As an example, foam in the vessel may not be removed by the sludge pump, which therefore may run for unnecessarily long time. Foaming may for example be present in brewery processes, e.g. when processing beer in the centrifugal separator. Beer foaming is caused due to the creation of bubbles from the released carbon-dioxide ($CO_2$) and since the solubility of $CO_2$ is a function of temperature and pressure of the liquid and from the amount of dissolved $CO_2$, running the centrifuge bowl at sub-atmospheric pressure will increase the foaming of the discharged sludge phase.

Consequently, foam in the collecting vessel may activate a high-level switch which will cause solids pump activation and, in many cases, also end with triggering a high-level alarm. This may cause interruption of the production due to the high-level alarms and dry running of the solids pump that significantly reduces the life of the pump stator.

In summary, the inventors have realized that foaming in the vessel has negative impact on the performance of the centrifugal separator, reducing the overall capacity and increasing the maintenance costs. By actively spraying the vessel with liquid after the removal of the discharged sludge phase from the vessel, the foaming may be decreased significantly and therefore decrease the risk of false alarms of high levels of matter in the vessel. Also, such spraying may aid in keeping any level sensors clean and further provide for keeping the sludge pump wet. By the spraying performed according to the inventive method, the operation of the centrifugal separator may be maintained for a longer period of time with a decreased amount of false high-level detections in the vessel.

Step a) of supplying a liquid mixture to the centrifuge bowl may be performed by supplying the liquid mixture via a stationary inlet pipe extending into the centrifuge bowl from the top, or via a rotating spindle onto which the centrifuge bowl is attached, such as via the bottom of the centrifuge bowl. Step a) may be performed while the centrifuge bowl is rotating.

Step b) of separating takes place within the centrifuge bowl, such as in a stack of separation discs arranged in the centrifuge bowl.

Step c) of removing gas may be performed before or during rotation of the centrifuge bowl, e.g. by means of a vacuum pump which is connected to the surrounding space, either directly or indirectly. This thus gives a sub-atmospheric pressure in the space in the frame surrounding the centrifuge bowl. The space may be sealed relative the surroundings by means of e.g. mechanical seals or liquid seals.

As discussed above, step d) of discharging the separated sludge phase may be performed continuously or intermittently.

Step e) of collecting the separated sludge phase may be performed simultaneously as the separated sludge phase is discharged to the surrounding space.

In embodiments of the first aspect, step f) is performed using a sludge pump. Such a sludge pump may thus be connected to the vessel.

The liquid used for spraying into the vessel may be an aqueous liquid, such as water.

In embodiments of the first aspect, step g) comprises spraying liquid into the vessel from the top of the vessel. Thus, the vessel may comprise spray nozzles arranged in the top of the vessel. The vessel may thus comprise surrounding side walls and an upper wall, and step g) may comprise spraying liquid from the upper wall.

In embodiments of the first aspect, step g) comprises spraying the liquid with spray droplets that are larger than a mist.

The spray droplets that are larger than a mist may be droplets with a size of above 60 micrometers.

As an example, step g) may comprise spraying the liquid with at least one spray nozzle configured to spray droplets larger than a mist. The spray nozzle may be configured for cleaning tanks of several cubic meters. The spray nozzle or nozzles used may be arranged for cleaning tanks having a larger volume than the volume of the vessel. Thus, step g) may comprise spraying larger large amounts of liquid to the vessel.

Step g) may comprise spraying liquid with a spray nozzle giving an umbrella-like spray pattern.

Thus, the method of the first aspect may be free from any step of spraying a liquid mist into the vessel.

In embodiments of the first aspect, the vessel is a cyclone. The cyclone may thus be arranged to gather and slow down the separated sludge phase.

The vessel may thus be arranged for collecting the separated sludge phase and any liquid that has been discharged from the sludge outlets. The vessel may further be connected to a sludge pump or further removal of the separated sludge phase and liquid present in the vessel.

In embodiments of the first aspect, the liquid mixture comprises a dissolved gas, such as $CO_2$. As an example, the liquid mixture may be a liquid mixture in the processing of beer. The method of the first aspect may thus be used for beer clarification and/or beer recovery from surplus yeast.

In embodiments of the first aspect, step g) comprises receiving information that that there is still matter present in said vessel after step f) has been performed.

Thus, step g) of spraying the liquid may be performed only when there is an indication that there is still material left in the vessel after the separated sludge phase has been removed by e.g. a sludge pump. This information may for example be received from a level sensor in the vessel and thus strongly indicates that there is foam in the vessel. Consequently, as an example, the information may be received from a level switch arranged in the vessel.

Moreover, step g) of spraying liquid may be performed after emptying the vessel but before a further separated sludge phase discharge from the centrifuge bowl is initiated. Thus, in embodiments of the first aspect step g) is performed before initiating a further discharge of the separated sludge phase.

However, liquid may be sprayed into the vessel during other steps of the method as well. As an example, the vessel may be sprayed with liquid before the discharge to keep the surface of the vessel wet, i.e. before step d), but also during collection of the separated sludge phase in the vessel, i.e. during step e), for keeping the separated sludge phase wet and more easily pumped by a sludge pump.

Thus, in embodiments of the first aspect, step d) comprises spraying liquid to the vessel before said discharge of the separated sludge phase.

In further embodiments, step e) may thus comprise spraying liquid to the vessel after collecting the separated sludge phase to wet the separated sludge phase.

Step g) as defined by the method may thus be a step of spraying the vessel with liquid that lies outside the normal discharge sequence, i.e. the liquid spraying in step g) may be activated based on a high-level switch in the vessel.

In embodiments, step g) is terminated, i.e. the liquid is stopped before initiating a further discharge, i.e. before another discharge of the separated sludge phase takes place.

The method is useful when the centrifuge bowl operates in a sub-atmospheric pressure, i.e. when there is a sub-atmospheric pressure in the surrounding space outside the bowl. This surrounding space may be in direct contact with the vessel such that there is also sub-atmospheric pressure in the vessel during operation of the centrifuge, i.e. during the separation of the liquid mixture in the centrifugal separator. This means that in embodiments of the first aspect, step c) also involves removing gas to obtain a sub-atmospheric pressure in the vessel.

As a second aspect of the invention, there is provided a centrifugal separator that can be used in the method of the first aspect. The centrifugal separator is arranged for separating at least one liquid phase and a separated sludge phase from a liquid mixture, comprising

- a centrifuge bowl arranged to rotate around an axis of rotation (X) and in which the separation of the liquid mixture takes place,
- a frame which delimits a surrounding space that is sealed relative the surroundings of the frame and in which said centrifuge bowl is arranged,
- a drive member configured to rotate the centrifuge bowl in relation to the frame around the axis of rotation (X), wherein the centrifuge bowl further comprises an inlet for receiving the liquid mixture to be separated, at least one liquid outlet for discharging the at least one separated liquid phase and a sludge outlet for discharging the separated sludge phase to the surrounding space, a vessel connected to the surrounding space and arranged for collecting the separated sludge phase discharged from the centrifuge bowl, a pump device arranged for removing gas to obtain sub-atmospheric pressure in said surrounding space, a spray device for spraying liquid into said vessel, a sludge pump for removing the separated sludge phase from said vessel, a control unit configured to initiate spraying of liquid into said vessel after the separated sludge phase has been removed from said vessel to reduce the level of foam present in said vessel.

This aspect may generally present the same or corresponding advantages as the former aspect. Effects and features of this second aspect are largely analogous to those described above in connection with the first aspect. Embodiments mentioned in relation to the first aspect are largely compatible with the second aspect.

The centrifugal separator is for separation of a liquid mixture. The liquid mixture may be an aqueous liquid or an oily liquid. As an example, the centrifugal separator may be for separating solids and one or two liquids from the liquid mixture. The liquid mixture may for example a biopharmaceutical mixture or a food product, such as beer, juice or other beverages.

The frame of the centrifugal separator is a non-rotating (stationary) part. The centrifuge bowl of the separator may be arranged to be rotated around vertical axis of rotation, i.e. the axis of rotation (X) may extend vertically. The centrifuge bowl is usually supported by a spindle, i.e. a rotating shaft, and may thus be mounted to rotate with the spindle. Consequently, the centrifugal separator may comprise a spindle that is rotatable around the axis of rotation (X). The centrifugal separator may be arranged such that the centrifuge bowl is supported by the spindle at one of its ends, such at the bottom end or the top end of the spindle.

The drive member may comprise an electrical motor having a rotor and a stator. The rotor may be fixedly connected to a rotating part, such as to a spindle. Advantageously, the rotor of the electrical motor may be provided on or fixed to the spindle of the rotating part. Alternatively, the drive member may be provided beside the spindle and rotate the rotating part by a suitable transmission, such as a belt or a gear transmission.

The centrifuge bowl encloses by rotor walls a separation space. The separation space, in which the separation of the fluid mixture takes place may comprise separation members, such as a stack of separation discs. The separation discs may e.g. be of metal. Further, the separation discs may be frustoconical separation discs, i.e. having separation surfaces forming frustoconical portions of the separation discs. The separation discs may be arranged coaxially around the axis of rotation (X) at a distance from each other such that to form passages between each two adjacent separation discs.

As used herein, the term “axially” denotes a direction which is parallel to the rotational axis (X). Accordingly, relative terms such as “above”, “upper”, “top”, “below”, “lower”, and “bottom” refer to relative positions along the rotational axis (X). Correspondingly, the term “radially” denotes a direction extending radially from the rotational axis (X). A “radially inner position” thus refers to a position closer to the rotational axis (X) compared to “a radially outer position”.

The centrifugal separator also comprises an inlet for liquid mixture to be separated. This inlet may be arranged for receiving the liquid mixture and be arranged centrally in the centrifuge bowl, thus at rotational axis (X). The centrifuge bowl may be arranged to be fed from the bottom, such as through a spindle, so that the liquid mixture is delivered to the inlet from the bottom of the separator. However, the centrifuge bowl may also be arranged to be fed from the top, such as through a stationary inlet pipe extending into the bowl.

Further, also one or two liquid outlets may be arranged at the top or the bottom of the centrifugal separator. The sludge outlet may comprise a set of nozzles for continuous discharge of the separated sludge phase during operation or is in the form of a set of intermittently openable outlets. The centrifuge bowl may therefore comprise at its outer periphery a set of radially sludge outlets in the form of intermittently openable outlets. The intermittently openable outlets may be equidistantly spaced around the axis of rotation (X).

The vessel may be a cyclone for receiving the discharged sludge phase. The cyclone may be arranged for decreasing the speed of the discharged sludge phase.

The pump device is for removing gas in the surrounding space. In embodiments, the pump device is also arranged for removing gas in the vessel to obtain a sub atmospheric pressure also in the vessel.

The pump device may comprise a liquid ring pump, a lamella pump, an ejector pump, a membrane pump, a piston pump, a scroll pump, a screw pump or combinations thereof. The pump device may further be a vacuum source or negative pressure source. A liquid ring pump prefilled with water is suitable for pumping of gas mixed with water. As an alternative, a lamella pump may be used for reaching pressures below the prevailing vapour pressure for water. An ejector pump further makes it possible to use existing liquid flows in the system, e.g. the flow of said fluid for centrifugal separation at an inlet or outlet, as a way of generating said negative pressure.

According to an embodiment of the invention, the pump device is arranged for removing both gas and liquid material from the space around the rotor, which liquid material may comprise medium supplied to the space, separated sludge phase discharged to the space from the separation space, condensate, cleaning agents or combinations thereof.

The pump device may be arranged to remove medium, e.g. gas and/or liquid, from the surrounding space around the centrifuge bowl either continuously or intermittently.

A pressure lower than atmospheric pressure may be a pressure of 1-50 kPa, preferably 2-10 kPa. The pump device may further be arranged to adjust the pressure in the space during operation on the basis of some operating condition of the centrifugal separator.

The spray device may comprise at least one spray nozzle. The at least one spray nozzle may be arranged for spraying liquid droplets that are larger than a mist. The spray device may be arranged at the top of the vessel and be arranged to spray down into the vessel.

The at least one spray nozzle may be a single axis spray device, such as a spray nozzle having a rotary spray head. The at least one spray nozzle may be arranged such that liquid is expelled from a rotating spherically shaped spray head through a defined number of orifices (e.g., slots, holes and/or any arbitrary shaped orifice). This may be different from a spray nozzle in which liquid is expelled from a rotating open structure disc that has no defined orifices.

The spray nozzles may be arranged for spraying droplets that are larger than a mist, which may be droplets with a size of above 60 micrometers. The spray nozzles may be arranged for a 360-degree spraying.

The sludge pump may be provided with a check valve function which prevents flow into the vessel via the sludge pump.

The control unit may comprise any suitable type of programmable logical circuit, processor circuit, or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. Thus, the control unit may comprise a processor and an input/output interface for communicating with the spray device and an e.g. a device for indicating the level of the separated sludge phase in the vessel.

Consequently, in embodiments of the first aspect, the centrifugal separator is further comprising a level switch arranged in said vessel, and wherein the control unit is configured to receive input from said level switch after the separated sludge phase has been removed from said vessel and to initiate spraying of liquid into said vessel if said input from the level switch indicates that there is still matter present in said vessel.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

The method and the centrifugal separator according to the present disclosure will be further illustrated by the following description with reference to the accompanying drawings.

Figure 1:
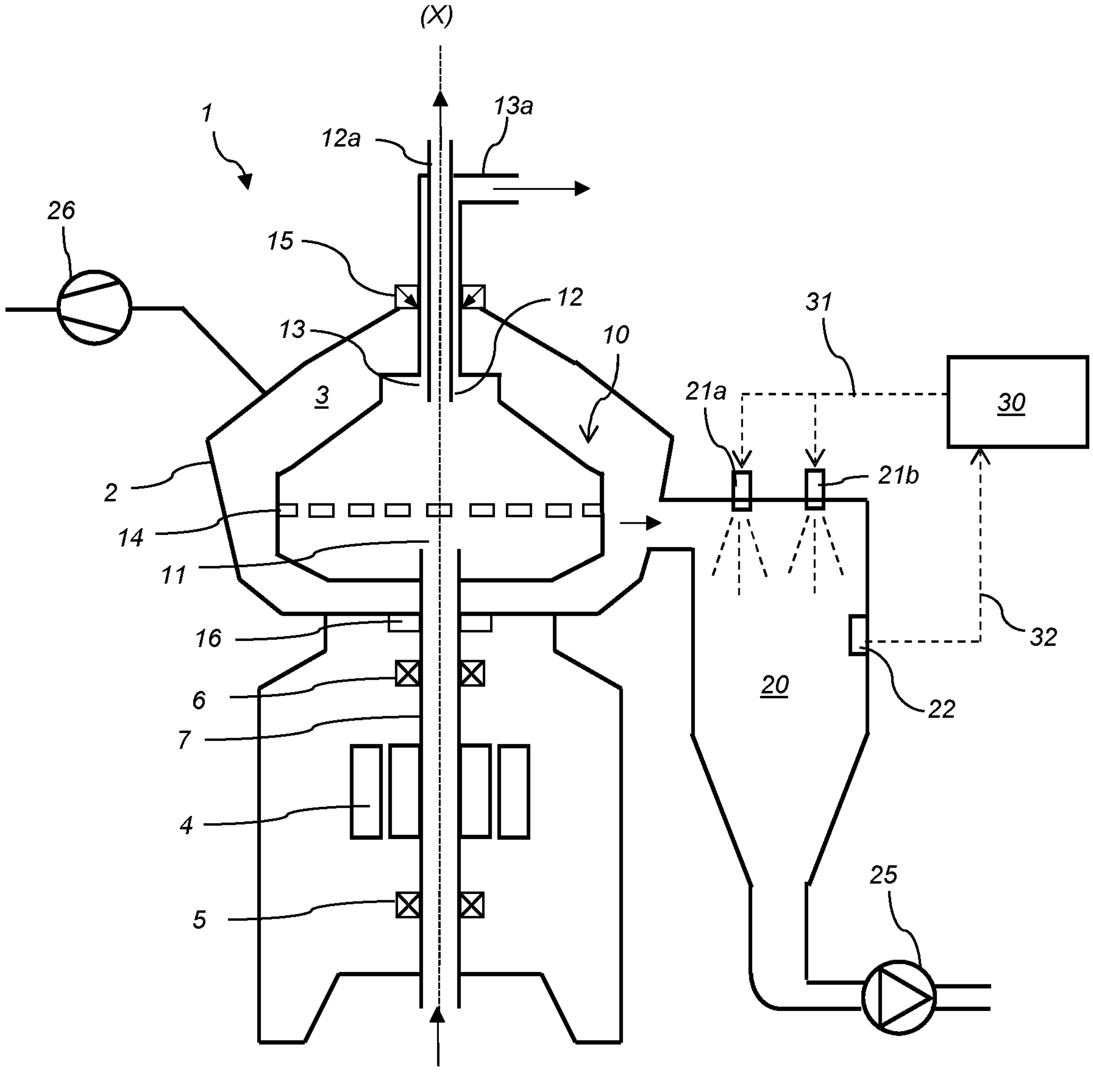
FIG. 1 shows a schematic drawing of a centrifugal separator according to an embodiment of the present invention.

FIG. 1 show a cross-section of an embodiment of a centrifugal separator 1 arranged to separate a sludge phase, a liquid heavy phase and a liquid light phase from a liquid mixture.

The centrifugal separator 1 comprises a centrifuge bowl 10 which is arranged to rotate around an axis of rotation (X) by means of a spindle 7. The spindle 7 is supported in the centrifugal separator's frame 2 in a bottom bearing 5 and a top bearing 6. The centrifuge bowl 10 forms within itself a separation chamber in which centrifugal separation of the liquid mixture takes place during operation. The separation space within the centrifuge bowl 10 is provided with a stack of frusto-conical separation discs in order to achieve effective separation of the liquid mixture.

The spindle 7 is in this example a hollow spindle for introducing the liquid mixture to the inlet 11 of the centrifuge bowl 10. The centrifuge bowl 10 further comprises a liquid outlet 12 for discharging a separated liquid light phase and a liquid outlet 13 for discharging a liquid heavy phase. The liquid light phase outlet 12 is arranged at a smaller radius than the liquid heavy phase outlet 13. There is further a stationary outlet pipe 12*a* connected to the liquid light phase outlet 12 for receiving the separated liquid light phase, and a stationary outlet pipe 13*a* connected to the liquid heavy phase outlet 13 for receiving the separated liquid heavy phase.

The centrifuge bowl 10 further comprises a sludge outlet 14 for discharging a separated sludge phase to the surrounding space 3, which is sealed relative the surroundings of the frame 2 and in which the centrifuge bowl 10 is arranged. The sludge outlet 14 takes the form of a set of intermittently openable sludge outlets arranged at the outer periphery of the centrifuge bowl 10, for discharge of the separated sludge phase from a radially outer portion of the separation space to the surrounding space 3. Such intermittent discharge may be performed by an axially movable operating slide arranged within the centrifuge bowl 10, as known in the art.

The centrifugal separator 1 further comprises a drive motor 4 configured to rotate the centrifuge bowl 10 in relation to the frame 2 around the axis of rotation (X). The drive motor 4 is connected directly to the spindle 7. However, the drive motor may also be connected to the spindle 7 via a transmission means in the form of a worm gear which comprises a pinion and an element connected to the spindle in order to receive driving torque. The transmission means may alternatively take the form of a propeller shaft, drive belts or the like.

The surrounding space 3 is sealed relative the surroundings of the frame by means of an upper seal 15 and a lower seal 16. The frame 3 thus delimits a space 3 which contains the centrifuge bowl 10 and which is air-tightly sealed relative to the surroundings of the frame. The upper seal 15 may be an outlet seal that seals the liquid outlets from the surroundings. If thee centrifugal separator is arranged with a stationery inlet pie extending into the centrifuge bowl from the top, the upper seal 15 could also be the seal that seal the inlet from the surroundings.

The upper seal 15 could for example be a mechanical seal or a liquid seal. Further, the upper seal 15 may be a gas seal, a liquid seal, a labyrinth seal or combinations thereof. Also the lower seal 16 could be a mechanical seal or a liquid seal. Further, the lower seal 16 may be a gas seal, a liquid seal, a labyrinth seal or combinations thereof.

One or both of the upper 15 and lower seal 16 could be a hermetic seal.

The centrifugal separator is further provided with a pump device 26 for removal of gas from the surrounding space 3, which pump device 26 takes the form of a water-filled liquid ring pump or, as an alternative, a lamella pump. The pump device is in this example connected directly to the frame 3 but could as an example also be connected to the vessel 20 discussed below.

The centrifugal separator further comprises a vessel 20 connected to the surrounding space 3. The vessel 20 is in the form of a cyclone and arranged for collecting the separated sludge phase discharged from the centrifuge bowl 10. The vessel 20 is further connected to a discharge device 25 in the form of a sludge pump for discharge of the separated sludge phase and the separated liquid phase present in the vessel 20. The sludge pump is provided with a check valve function which prevents flow into the vessel 20 via the sludge pump.

The vessel 20 further comprises a spray device in the form of spray nozzles 21*a*, 21*b* for spraying liquid, such as water, into the vessel 20. As an example, the vessel may comprise at least two, such as at least three, spray nozzles. The spray nozzles 21*a*, 21*b*, are in the form of spray nozzles having rotary spray heads and are configured to spray liquid droplets larger than a mist into the vessel 20.

Spraying liquid into the vessel 20 is controlled by control unit 30, as indicated by arrow 31. The control unit 30 is configured for initiating spraying with the nozzles 21*a* 21*b* after the separated sludge phase has been removed from the vessel 20 to reduce the level of foam present in the vessel 20. However, the control unit may also be configured to spray liquid into the vessel before discharge of the separated sludge phase and after discharge of the separated sludge phase, to both wet the inner surfaces of the vessel 20 and to wet the discharged sludge phase.

There is further a level switch 22 arranged in the vessel 20. This level switch 22 may for example comprise one or several sensors for indicating the level of sludge or matter in the vessel 20. The control unit 30 is further configured to receive input from the level switch 22 continuously or e.g. after the separated sludge phase has been removed from the vessel (20). Based on this input, the control unit 30 is configured to initiate spraying of liquid into the vessel 20 if the input from the level switch 22 indicates that there is still matter present in the vessel 20 after the sludge pump 25 has removed the separated sludge phase.

Thus, the control unit 30 may for example comprise a calculation unit which may take the form of substantially any suitable type of programmable logical circuit, processor circuit, or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The calculation unit may represent a processing circuitry comprising a plurality of processing circuits, such as, e.g., any, some or all of the ones mentioned above. The control unit 30 may further comprise a memory unit which provides the calculation unit with, for example, stored program code and/or stored data which the calculation unit needs to enable it to do calculations. The calculation unit may also be adapted to storing partial or final results of calculations in the memory unit. The memory unit may comprise a physical device utilised to store data or programs, i.e., sequences of instructions, on a temporary or permanent basis.

Figure 2:
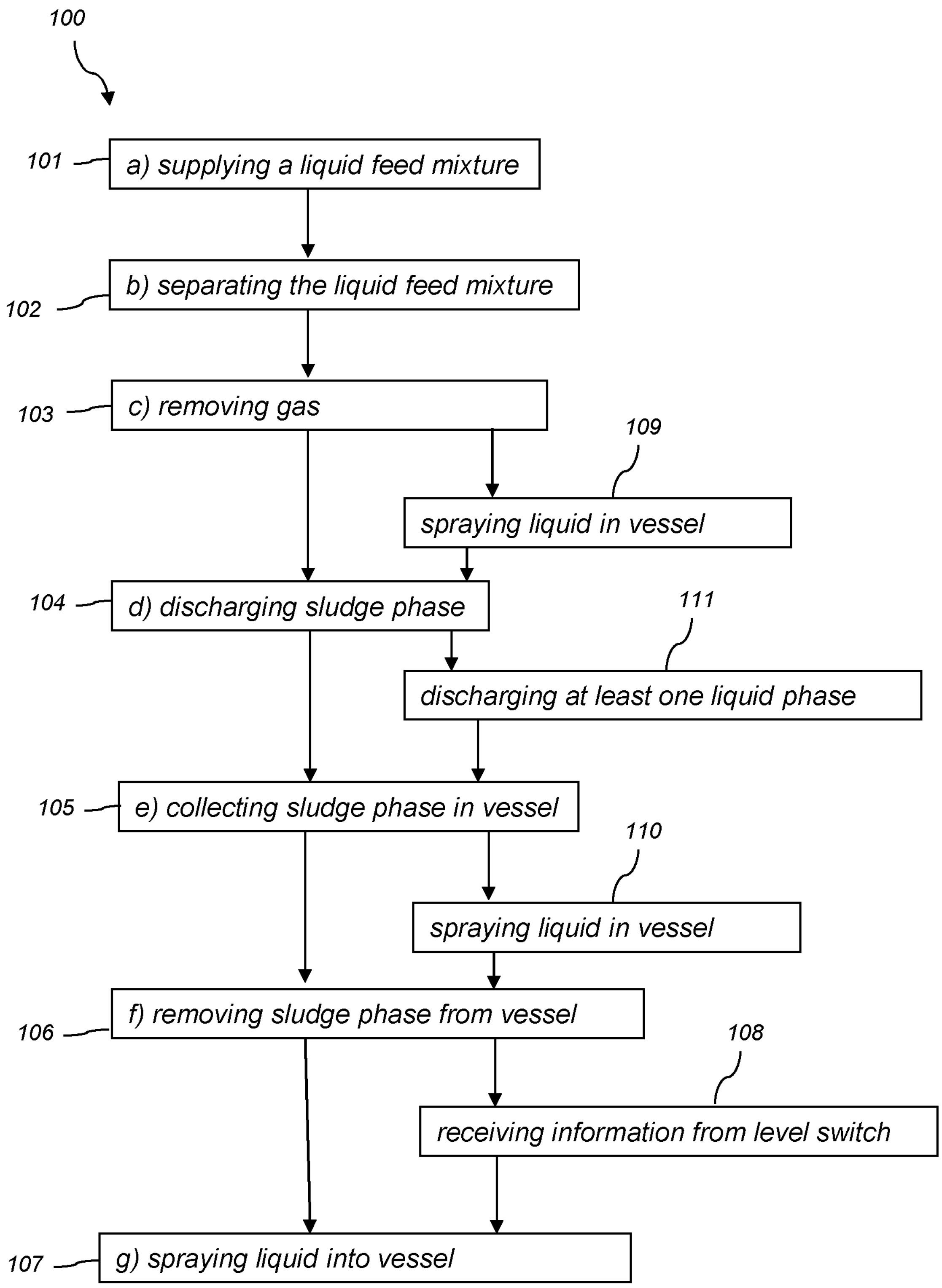
FIG. 2 shows a flow chart of a method of separating a liquid mixture in a centrifugal separator.

The method of the present invention is further illustrated by the flow chart in FIG. 2. During operation of the separator in FIG. 1, the centrifuge bowl 10 is caused to rotate by torque transmitted from the drive motor 4 to the spindle. Gas is pumped out of the surrounding space 3 outside the centrifuge bowl 10 by the vacuum pump 26, thereby maintaining in the surrounding space 3 a pressure of e.g. 1-50 kPa, such as 2-10 kPa. Since vessel 20 is in connection with the surrounding space 3, the pump also maintains a sub-atmospheric pressure in the vessel 20. Via the inlet 11, a liquid mixture to be separated is brought into the separation space within the centrifuge bowl 10 and between the conical separation discs fitted in the separation space. The liquid mixture is a liquid mixture comprising dissolved gas, such as dissolved $CO_2$.

Heavier components in the liquid mixture, e.g. sludge particles and/or heavy phase, move radially outwards between the separation discs and accumulate within the sludge phase outlets 14. The separated sludge phase is emptied intermittently from the separation space by the sludge outlets 14 being opened, whereupon the separated sludge phase and a certain amount of fluid is discharged from the separation space by means of centrifugal force. The discharge of the separated sludge phase may also take place continuously, in which case the sludge outlets 14 take the form of open nozzles and a certain flow of sludge phase and/or heavy phase is discharged continuously by means of centrifugal force. The separated sludge phase which is discharged from the separation space via the sludge outlets 14 is conveyed from the surrounding space 3 to the vessel 20 connected thereto, in which the separated sludge phase accumulates and from which it is pumped out by the sludge pump 25. A separated liquid light phase moves radially inwards between the separation discs and is discharged via the liquid light phase outlet 12 to the stationary outlet pipe 12*a*, whereas separated liquid heavy phase is discharged via the liquid heavy phase outlet 13 to the stationary outlet pipe 13*a*. Thus, as illustrated in FIG. 2, the method comprises the steps of a) supplying 101 a liquid mixture to be separated to the inlet 11 of the centrifuge bowl 10, b) separating 102 the liquid mixture into at least one separated liquid phase and a separated sludge phase, c) removing 103 gas from the surrounding space 3 to obtain a sub-atmospheric pressure in the surrounding space 3 and a sub-atmospheric pressure in said vessel 20 d) discharging 104 a separated sludge phase to the surrounding space 3 and discharging 111 a separated liquid phase, e) collecting 105 the separated sludge phase in the vessel 20, and f) removing 106 the separated sludge phase from the vessel 20, The discharge of step d) may be preceded by spraying liquid into the vessel 20 by the spray nozzles 21*a*, 21*b* to wet the inner surfaces of the vessel 20. Further when the separated sludge phase has been collected in the vessel 20, an additional spray of liquid may be performed by the spray nozzles 21*a*, 21 b. Thus, the method 100 may comprise spraying 109 liquid to said vessel 20 before the discharge of a separated sludge phase and spraying 110 liquid to the vessel 20 after collecting the separated sludge phase. Consequently, the method may comprise a discharge spray sequence at discharge which comprises spraying liquid just before and/or during discharge of the separated sludge phase and spraying liquid to the vessel 20 when the separated sludge phase has been collected. Such a spray sequence may be initiated by the control unit 30, which may thus be connected to or form part of the control system of the whole centrifugal separator 1.

The sub-atmospheric pressure in the vessel 20 may give rise to foaming in the vessel 20 due to the creation of bubbles from the released carbon-dioxide ($CO_2$) that has been discharged in the separated sludge phase. This is because the solubility of $CO_2$ is a function of temperature and pressure of the liquid and from the amount of dissolved $CO_2$. Foam in the vessel 20 may activate the high-level switch 22 and as a response to this, the method comprises an additional step g) of spraying 107 liquid into the vessel 20 after step f) has been performed. This additional spraying of liquid, which is thus outside the discharge spray sequence, is to reduce the level of foam present in said vessel 20. Such a step g) is thus performed initiating a further discharge of a separated sludge phase, i.e. before initiating a further discharge spray sequence.

The additional spraying of step g) may also be activated by the control unit based on input from the level switch 22. Thus, step g) comprises receiving 108 information that that there is still matter (foam) present in the vessel 20 after step f) has been performed, and then spraying 107 liquid into the vessel 20 after step f) to reduce the level of foam present in the vessel 20.

Thus, the control unit 30 is configured to initiate spraying of liquid via the spray nozzles 21*a*, 21*b* into the vessel 20 before discharge initiate spraying of liquid via the spray nozzles 21*a*, 21*b* into the vessel 20 when the separated sludge phase has been collected in the vessel receive input from level switch 20 that there is still matter present in the vessel after the separated sludge phase has been removed from the vessel, and initiate an additional spraying of liquid via the spray nozzles 21*a*, 21*b* based on the received input from the level switch 22 to reduce foam in the vessel 20.

The control unit 30 may further be configured to control the discharge of the separated sludge phase from the centrifuge bowl 10. The discharge may be controlled via an operating water module OWM (not shown) as known in the art. Consequently, the control unit 30 may be further configured to initiate discharge of a separated sludge phase from centrifuge bowl 10.

The invention is not limited to the embodiment disclosed but may be varied and modified within the scope of the claims set out below. The invention is not limited to the orientation of the axis of rotation (X) disclosed in the figures. The term "centrifugal separator" also comprises centrifugal separators with a substantially horizontally oriented axis of rotation. In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A method of separating a liquid mixture in a centrifugal separator, wherein the centrifugal separator comprises:
- a centrifuge bowl arranged to rotate around an axis of rotation and in which the separation of the liquid mixture takes place;
- a frame delimiting a surrounding space that is sealed relative to surroundings of the frame and in which said centrifuge bowl is arranged;
- a drive member configured to rotate the centrifuge bowl in relation to the frame around the axis of rotation, wherein the centrifuge bowl further comprises an inlet for receiving the liquid mixture to be separated, at least one liquid outlet for discharging at least one separated liquid phase and a sludge outlet for discharging a separated sludge phase to the surrounding space; and
- a vessel connected to the surrounding space and arranged for collecting the separated sludge phase discharged from the centrifuge bowl, wherein the method comprises the steps of:
- a) supplying the liquid mixture to be separated to the inlet of the centrifuge bowl;
- b) separating the liquid mixture into the at least one separated liquid phase and the separated sludge phase;
- c) removing gas from the surrounding space to obtain a sub-atmospheric pressure in the surrounding space;
- d) discharging the separated sludge phase to said surrounding space;
- e) collecting said separated sludge phase in said vessel;
- f) removing said separated sludge phase from said vessel; and
- g) spraying liquid into said vessel after step f) to reduce a level of foam present in said vessel.

2. The method according to claim 1, wherein step g) comprises spraying said liquid into the vessel from a top of the vessel.

3. The method according to claim 2, wherein step g) comprises spraying said liquid with spray droplets that are larger than a mist.

4. The method according to claim 2, wherein the vessel is a cyclone.

5. The method according to claim 2, wherein the liquid mixture comprises a dissolved gas.

6. The method according to claim 1, wherein step g) comprises spraying said liquid with spray droplets that are larger than a mist.

7. The method according to claim 6, wherein the vessel is a cyclone.

8. The method according to claim 1, wherein the vessel is a cyclone.

9. The method according to claim 1, wherein the liquid mixture comprises a dissolved gas.

10. The method according to claim 9, wherein the liquid mixture is a liquid mixture in the processing of beer.

11. The method according to claim 9, wherein the dissolved gas is $CO_2$.

12. The method according to claim 1, wherein step g) comprises receiving information that that there is still matter present in said vessel after step f) has been performed.

13. The method according to claim 12, wherein said information is received from a level switch arranged in said vessel.

14. The method according to claim 1, wherein step g) is performed before initiating a further discharge of the separated sludge phase.

15. The method according to claim 1, wherein step d) comprises spraying liquid to said vessel before said discharge of the separated sludge phase.

16. The method according to claim 1, wherein step e) comprises spraying liquid to said vessel after collecting said separated sludge phase to wet said separated sludge phase.

17. The method according to claim 1, wherein step c) also involves removing gas to obtain a sub-atmospheric pressure in said vessel.

18. The method according to claim 1, wherein step f) is performed using a sludge pump.

19. A centrifugal separator for separating at least one liquid phase and a separated sludge phase from a liquid mixture, comprising:
- a centrifuge bowl arranged to rotate around an axis of rotation and in which the separation of the liquid mixture takes place;
- a frame delimiting a surrounding space that is sealed relative to surroundings of the frame and in which said centrifuge bowl is arranged;
- a drive member configured to rotate the centrifuge bowl in relation to the frame around the axis of rotation, wherein the centrifuge bowl further comprises an inlet for receiving the liquid mixture to be separated, at least one liquid outlet for discharging the at least one separated liquid phase and a sludge outlet for discharging the separated sludge phase to the surrounding space;
- a vessel connected to the surrounding space and arranged for collecting the separated sludge phase discharged from the centrifuge bowl;
- a pump device arranged for removing gas to obtain sub-atmospheric pressure in said surrounding space;
- a spray device for spraying liquid into said vessel;
- a sludge pump for removing the separated sludge phase from said vessel; and
- a controller configured to initiate spraying of liquid into said vessel after the separated sludge phase has been removed from said vessel to reduce a level of foam present in said vessel.

20. The centrifugal separator according to claim 19, further comprising a level switch arranged in said vessel, and wherein the controller is configured to receive input from said level switch after the separated sludge phase has been removed from said vessel and to initiate spraying of liquid into said vessel if said input from the level switch indicates that there is still matter present in said vessel.

* * * * *